G. B. Hamlin,
Making Cider.

№ 111,930. Patented Feb. 21, 1871.

Wm H Bishop
C. E. Warren

Geo. B. Hamlin.
By atty
J. N. McIntire

United States Patent Office.

GEORGE B. HAMLIN, OF WILLIMANTIC, CONNECTICUT.

Letters Patent No. 111,930, dated February 21, 1871.

IMPROVEMENT IN MAKING CIDER.

The Schedule referred to in these Letters Patent and making part of the same.

*To all whom it may concern:*

Be it known that I, GEORGE B. HAMLIN, of the city of Willimantic, of the county of Windham in the State of Connecticut, have invented a certain new and improved Process of Making Cider; and I do hereby declare that the following is a full and exact description thereof, reference being had to the accompanying drawing making part of this application.

Previous to my invention it has been customary in the process of making cider to subject the fruit to a grinding or crushing operation in what is known as a "cider-mill."

These mills for disintegrating the fruit, or preparing it for the pressing operation, have been made in a great variety of ways, but in all of them the operation performed on the fruit has been such that the apple has been either crushed to pieces or torn to pieces by rapidly-moving grinders or projections.

In the manufacture of cider it is a great desideratum not only to provide a means for properly disintegrating the fruit without an expensive outlay of power, but to have the apple first prepared in such a manner that the muscle will be perfectly disintegrated, and the whole reduced to such a condition that, with the least possible power, all the contained juice of the fruit may be abstracted. This desirable end cannot be practically attained to with the present mode of grinding or crushing up the fruit.

I propose to obtain all the contained juice from the fruit by subjecting it first to a process by which the muscle is all cut to pieces and the apple reduced, by cutting in lieu of a crushing operation, to a condition in which it may readily have all the juice expressed; and My invention consists in preparing the fruit (in the process of making cider) for the press in a finely cut-up condition, as hereinafter more fully explained.

To enable those skilled to practice my new process I will proceed to describe it more particularly, referring, by letters, to the accompanying drawing, illustrating an apparatus such as I propose to employ in carrying out my invention.

In the drawing—

Figure 1:
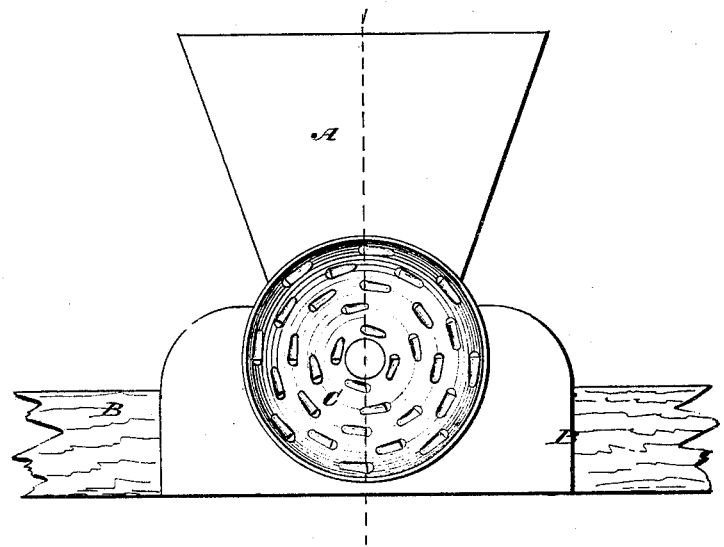
Figure 1 is an elevation.
Figure 2:
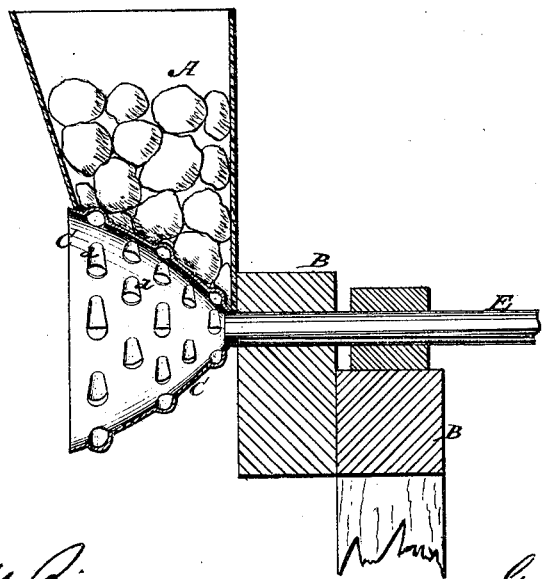
Figure 2 is a sectional view of a mechanism such as may be used in carrying out my improved process, and consists of a suitable hopper, A, in which is placed the supply of apples, and which is mounted on a suitable frame, B.

In the lower portion or throat of the hopper A is arranged a rotary conical shell, C, the surface of which is formed or provided with numerous cutters *d*.

This cutter-cylinder or conical shell C is mounted on a shaft, E, which is driven by any suitable driving mechanism or gearing, through which the motive-power may be most efficiently and economically transmitted.

And the cutters should be so constructed and arranged that, as the shell C rotates, they will cut small or fine pieces or shavings from the apple, and so that all the pieces cut from the fruit contained in the hopper will pass through the throats of the cutters and be discharged clean through the shell C.

In lieu of the conical shell C some other shaped cutting device may be employed, and the design of the other parts of the apparatus shown is, of course, immaterial, so long as an apparatus is used which will cut or shave the fruit up by a clean cutting process in contradistinction to a crushing or mangling process such as has been heretofore universally practiced.

It will be understood that I am enabled by this process of first cutting up the fruit, in lieu of crushing or grinding it, to not only extract with more facility a greater percentage of juice from the fruit so prepared, but also to save great expense and labor in the preparation, on account of the much greater ease and the much less power with which this cutting process can be performed by machinery, than a crushing or grinding operation can be carried on.

It will be understood that any suitable apparatus or machinery may be employed for carrying out my invention; and that I do not make any claim of invention in the matter of the machine or apparatus shown and described in this application, the gist of my invention resting in the idea of preparing the apples, in a finely-cut condition, with the muscle completely disintegrated, in contradistinction to having them ground, crushed, broken, or torn into fragments, as heretofore has been practiced in the manufacture of cider.

Having explained my improvement, and the method of preparing the fruit for the press in lieu of grinding it,

What I claim as new in the process of making cider, and desire to secure by Letters Patent, is—

Preparing the apples, for the expression of the juice, in a cut condition, substantially as herein set forth.

In testimony whereof I have hereunto set my hand and seal this 16th day of August, 1870.

GEORGE B. HAMLIN. [L. S.]

Witnesses:
E. V. RICHARDSON,
O. H. BARTLETT.